May 26, 1931. J. H. CALDWELL 1,807,150
LAND CLEARING MACHINE
Filed Feb. 5, 1930   3 Sheets-Sheet 1

Inventor
John H. Caldwell
By [signature]
Attorneys

May 26, 1931.  J. H. CALDWELL  1,807,150
LAND CLEARING MACHINE
Filed Feb. 5, 1930   3 Sheets-Sheet 3
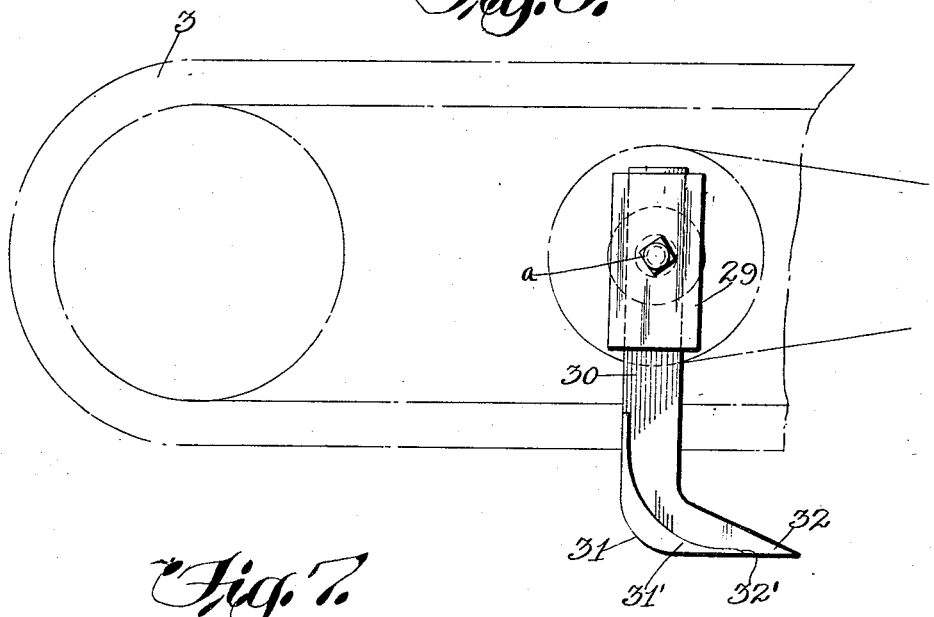
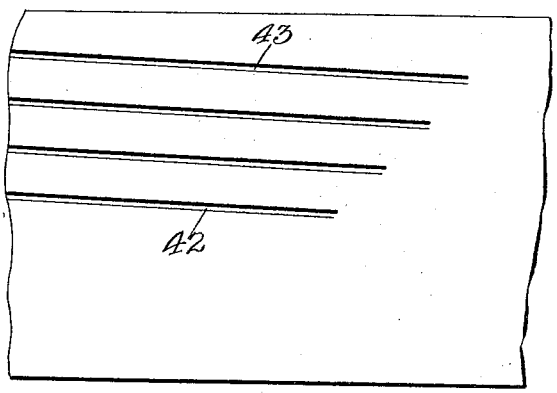
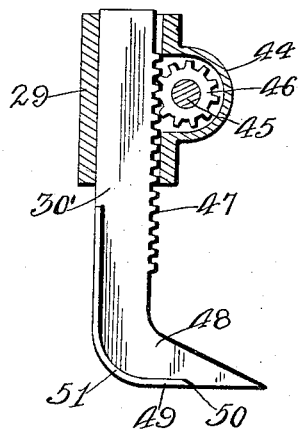
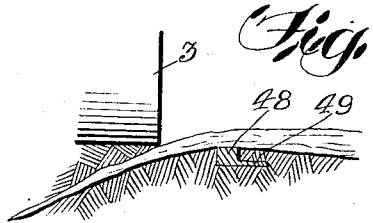
Inventor
John H. Caldwell
By Vany & Vany
Attorneys Patented May 26, 1931

1,807,150

UNITED STATES PATENT OFFICE

JOHN H. CALDWELL, OF MILWAUKEE, WISCONSIN

LAND CLEARING MACHINE

Application filed February 5, 1930. Serial No. 426,007.

This invention relates to improvements in land clearing machines.

One of the objects of my invention is the provision of a machine which can be tractor driven and so constructed and arranged as to remove stumps, roots and such articles from land being cleared, and is also provided with means whereby these articles can be fired during or immediately following the clearing of the land.

Another object of my invention is the provision of a land clearing machine which includes a traction element having supported thereon a roller positioned diagonally of the direction of travel of the traction element and provided with spirally arranged teeth which are adapted to engage roots, sticks and similar pieces for moving these pieces to one side of the field or plot being cleared and also to provide a cutter or digger which is adapted to engage beneath the surface of the earth for withdrawing and breaking the roots or stumps, whereby the stumps, through the movement of the machine, can be readily uprooted and forced to the side of the field.

A further object of my invention is the provision of a land clearing device which comprises a traction element having pivotally mounted thereon a frame which supports a revolving roller having its exterior thereof provided with a plurality of spirally arranged teeth, the roller being positioned diagonally across the direction of travel of the traction element so that as the teeth penetrate the earth for digging up smaller roots and picking up branches, roots and the like from the top of the earth, the teeth will leave a plurality of parallel tracks or lines behind the machine due to the particular arrangement of the roller or drum with respect to the direction of travel, this particular arrangement of the drum and teeth assuring positive contact with all sections of the earth over which the roller or drum travels.

With the above and other objects in view, the invention consists in the novel features of construction, the combination and arrangement of parts hereinafter more fully set forth, pointed out in the claims and shown in the accompanying drawings wherein:

Figure 6 is a side elevation of the digging member;

Figure 7 is a detail plan view, illustrating the relative tracks left by the teeth of the roller;

Figure 8 is a side elevation of the digging member with parts broken away and illustrated in cross section and showing a modified form of the same; and, Figure 9 is a detailed view illustrating the operative position of the digging member with respect to a root and one of the traction wheels.

Figure 1:
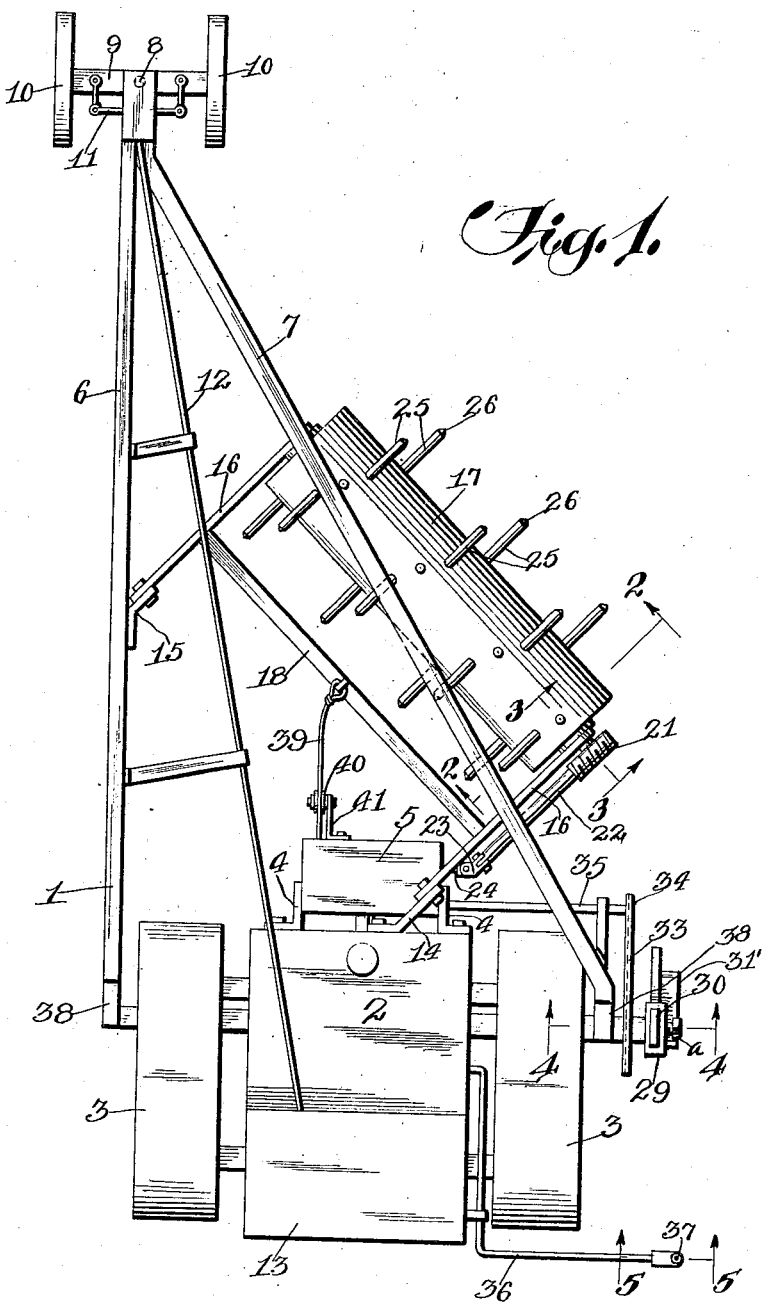
Figure 1 is a plan view of a land clearing machine constructed in accordance with my invention.
Figure 2:
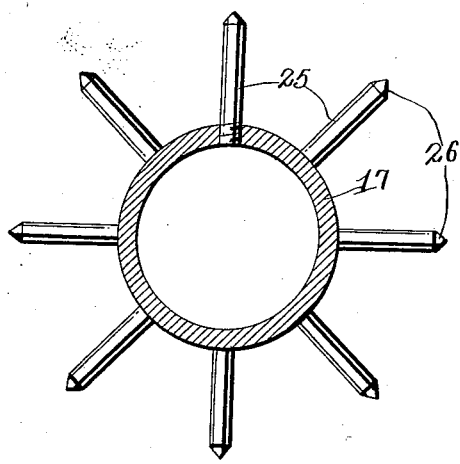
Figure 2 is a detailed transverse section on the line 2—2 of Figure 1.

Referring more particularly to the drawings, 1 indicates in general a frame preferably of channel iron in order to assure proper strength for the same. This frame supports a motor 2 and is connected to the caterpillar tractors 3. At the forward portion of the motor 2, I provide angular supporting brackets 4 which support the differential or gear box 5 in which the differential and operating gears are positioned.

The frame 1 includes a forwardly extending tongue-like portion 6 and a diagonal brace member 7, the inner ends of which are disposed upon opposite sides of the caterpillar tractors 3, while the outer ends are secured together at 8. The forward ends of the tongue-like member 6 and brace bar 7 are mounted upon a transverse axle 9 having steering wheels 10 at the ends thereof. The axle 9 is provided with the usual steering yoke 11 connected to a rod 12 which extends back above the motor housing 2 and beneath the cover-like member 13, which is disposed above the driver's seat, whereby the inner end of this steering rod 12 will be positioned in close proximity to the driver for readily steering the device.

At the front of the motor housing 2, I provide a supporting bracket 14 and a similar bracket 15 is attached to the tongue-like member 6, thus positioning these brackets at diagonal points with respect to the direction of travel of the machine. Pivotally mounted upon these brackets 15 are the side arms 16 of a frame which supports a rotatable drum 17. The arms 16 are connected intermediate their ends by means of a transverse brace member 18.

Figure 3:
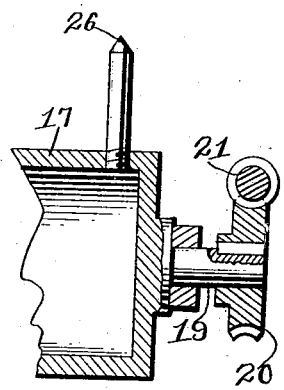
Figure 3 is a detailed section on the line 3—3 of Figure 1.
Figure 4:
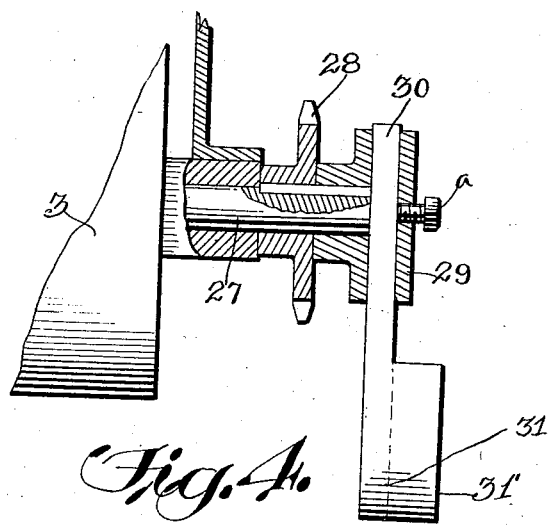
Figure 4 is a detailed section substantially on the line 4—4 of Figure 1, with parts thereof in elevation.
Figure 5:
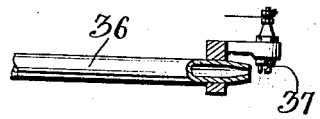
Figure 5 is a detailed section on the line 5—5 of Figure 1.

It will be apparent from the position of the brackets 14 and 15, that the drum 17 is disposed diagonally of the direction of travel of the machine and this drum is preferably hollow, as shown in Figure 3, and is provided at one end with a stub shaft 19, carrying a worm gear 20 which meshes with a worm 21 on a shaft 22. This shaft 22 is connected by means of a universal coupling 23 to a stub shaft 24, projecting from the differential or gear housing 5, thus operatively connecting the drum 17 with the motor.

The drum 17 is provided with a plurality of spirally arranged threaded apertures and threaded into these apertures are the fingers 25, the outer ends of which are tapered to an engaging point, as shown at 26, so that these fingers will readily penetrate the surface over which the machine is travelling in order to assist in picking up and removing from the earth just beneath the surface thereof, roots, branches, and similar articles for carrying these articles toward the side of the field.

It will be noted that the frame 1 supports at one side thereof a stub axle 27 which carries a sprocket 28, and a sleeve member 29. The sleeve member 29, as illustrated, is preferably rectangular in shape and slidably mounted therein is the shank 30 of a digging element 31. The body of this digging element extends forwardly toward the front of the machine and has a tapering point 32 which is adapted to penetrate the earth's surface and ride along beneath the earth's surface, as shown at Figure 9, where it will engage roots, and other parts beneath the earth's surface, so as to bring them to the top where they can be engaged by the fingers 25 so as to be moved to the side of the field through the rotation of the drum 17.

The digging element 31 is rotated at a comparatively high rate of speed through the medium of a sprocket chain 33 which extends forwardly to a sprocket 34 on the outer end of a shaft 35. The inner end of this shaft 35 is operatively connected to the mechanism in the gear housing 5 for continually rotating the shaft during the movement of the machine.

It will be noted from the foregoing that in the operation of the machine, the tractor is driven forwardly and during the forward movement of the same, the shaft 27 is rotated for engaging the digging element 31 with the earth, so as to uproot any branches or roots growing beneath the earth's surface, and either cut or break them off so that upon the next turn of the machine, the fingers 25 of the drum 17 will engage these broken or cut parts and move them toward the side of the field.

It will be noted that upon each turn of the machine around the field, the digging element 31 is uprooting any members beneath the earth's surface so that they can be readily engaged by the fingers 25, and after the machine has passed around the field two or three times, it will form a windrow which, if desired, can be ignited for burning by extending a gasoline supply pipe 36 from the supply tank of the motor to one side of the machine, as shown at Figure 1, and a spark plug 37 is supported upon the outer end of this pipe whereby the gasoline can be fired upon discharge of the pipe 36 to set fire to the windrow. This spark plug is connected up to the electric system of the motor and can be operated at the will of the operator.

In the construction of the main frame, the tongue-like members 6 and the brace 7 are supported a considerable distance above the tractor element and the motor housing 2 by means of the uprights 38, and this will leave plenty of room beneath the brace member 7 for raising and lowering the drum 17, when desired. It will be noted that a cable 39 is connected to the cross piece 18 of the drum frame, and this cable extends over a guide pulley 40 mounted on a bracket 41 attached to the gear housing, and the cable passes into the gear housing where it is wound upon a suitable drum, thus raising the drum 17 above the surface of the earth so that the fingers 25 will not engage the surface over which the machine is travelling when the device is not in use.

It will be noted, however, that when the drum 17 is in a lowered position and the same is rotated through its operative connection with the mechanism in the gear housing 5, the spiral arrangement of the fingers on the drum and the relative position of the drum with respect to the direction of travel will cause these fingers to travel in the paths indicated by the diagram in Figure 7. Here, it will be noted that the path of the fingers are arranged parallel but slightly inclined with respect to the direction of travel, the inside track 42 being substantially parallel with the outside track 43, and the intermediate tracks are also parallel with both the tracks 42 and 43, however, these tracks also extend slightly diagonally with respect to the direction of travel. Therefore, it will be apparent that due to the particular arrangement of the fingers 25 and drum 17, the fingers will engage practically all of the space of the surface beneath the drum so as to positively pick up and force to one side all sticks, roots and the like, which might be in the path of the machine.

In Figures 8 and 9, I have illustrated a slightly modified form of digging element, wherein the sleeve 29' is provided with an offset portion 44, in which is mounted a transverse stub shaft 45, carrying a pinion 46. The pinion 46 is adapted to mesh with the rack teeth 47 on one side of the shank 35. The body 48 of the digging element is tapered in the same manner as the main digging element, but at one side of the digging element, I provide a blade-like member 49 provided with a cutting edge 50 and at the rear of the cutting edge 50, the blade is curved as shown at 51 and thence extends upwardly parallel with the shank 30'.

From this arrangement, it will be apparent that when the roots and sticks beneath the earth's surface are cut or broken off, the curved portion 51 will have a tendency to direct them upwardly to positively remove them from beneath the surface of the earth, so that they can be readily picked up by the fingers 25 of the drum.

It will be noted that the body 31 of the digging element is provided with a laterally projecting cutting blade 31', the forward edge of which lies substantially parallel with the bottom of the digging element and is formed with a knife edge 32', which is disposed inwardly of the outer end of the tapered portion 32. This cutting blade has a curved inner face, as illustrated in Figure 6, whereby the roots or sticks severed by the cutting edge 32' will be guided upwardly and thrown to one side of the machine.

It will be apparent from the foregoing that by providing a cutting blade on the outer side of the digging member 31 that roots, sticks, and the like, which are disposed beneath the surface of the earth can be quickly severed thru the revolving motion of the digging element, and due to the particular shape of the cutting blade, these severed parts will be moved upwardly toward the top of the surface, where they will either be engaged by the fingers 25 of the drums 17, or carried off in any other suitable manner.

It will be apparent from the foregoing that I have provided an extremely useful machine for clearing fields of stumps, brush and the like, wherein the digging element 31 cuts a row of roots or the like slightly in advance of the action of the drum 17 and upon each turn of the field, the drum 17 will be picking up and throwing to one side, the roots and other particles which have been dug up by the digger 31, and after these sticks and roots have been moved into a windrow, they can be easily fired by discharging gasoline through the pipe 36 onto the material to be burned and firing the gasoline as it is discharged by the spark plug 37.

It will be noted that the shank 30 of the digging member 31 is adjustably mounted with the sleeve 29 and is held in various adjusted positions by means of the set screw $a$, whereby the depth of cutting or digging of the member 31 can be readily provided for.

While I have shown and described the preferred embodiment of my invention, it will be apparent that slight changes may be made in the construction when putting the invention into practice, without departing from the spirit of the same or the scope of the appended claims.

I claim:

1. A machine of the class described including a frame, a traction element supporting said frame, a drum frame pivotally mounted upon the first frame and disposed at an angle with respect thereto, a rotatable drum carried by the drum frame and extending diagonally across the direction of travel of the traction element, means forming operative connection between the drum and the traction element, a plurality of fingers projecting radially from the drum and arranged spirally thereof, and a digging element supported at one side of the traction element and operatively connected thereto.

2. In combination with a frame, a traction element supporting said frame, a rotatable drum carried by the frame, a plurality of radially projecting fingers carried by the drum and arranged spirally thereof, and an adjustable rotatable digging element supported at one side of the traction element and operatively connected thereto.

3. In a machine of the class described, a frame, a traction element for supporting said frame, a drum carried by the frame and disposed diagonally across the direction of travel of the traction element, a plurality of radially projecting fingers carried by the drum and arranged spirally thereof, means operatively connecting the drum with the traction element, means for raising and lowering said drum with respect to the frame, and a rotatable adjustable digging element supported at one side of the traction element and operatively connected thereto.

In testimony that I claim the foregoing I have hereunto set my hand at Milwaukee, in the county of Milwaukee and State of Wisconsin.

JOHN H. CALDWELL.